United States Patent [19]

Kawano

[11] Patent Number: 4,666,543
[45] Date of Patent: May 19, 1987

[54] HOLLOW FIBER DEVICE FOR REMOVING WASTE MATERIAL IN THE BLOOD AND A PROCESS OF MANUFACTURE THEREOF

[75] Inventor: Takumi Kawano, Kanagawa, Japan

[73] Assignee: Kasasumi Laboratories, Inc., Tokyo, Japan

[21] Appl. No.: 661,053

[22] Filed: Oct. 15, 1984

Related U.S. Application Data

[63] Continuation of Ser. No. 520,002, Aug. 3, 1983, abandoned.

[30] Foreign Application Priority Data

Aug. 6, 1982 [JP] Japan ................................ 57-135399

[51] Int. Cl.⁴ .............................................. B01D 13/00
[52] U.S. Cl. ................................ 156/169; 210/321.3; 210/500.23; 264/139
[58] Field of Search ........................ 264/139, 258, 311; 210/450, 433.2, 321.1, 321.2, 321.3, 500.25; 156/169

[56] References Cited

U.S. PATENT DOCUMENTS 3,228,876  1/1966  Mahon ...................... 210/433.2 X
3,442,002  5/1969  Geary, Jr. et al. .......... 210/321.1 X

*Primary Examiner*—Frank Spear
*Attorney, Agent, or Firm*—Michael J. Striker

[57] ABSTRACT

A method of manufacturing a medical hollow fiber device for removing waste material in the blood, including the steps of providing a housing; coiling hollow fiber membranes into loops; providing bundles of the loops whose entire interior is filled with a liquid and placing them into the housing; closing both ends of the housing with caps; supplying viscous potting material into the housing at the end portions of the hollow fiber membranes, and applying a centrifugal force to the housing. The potting material penetrates between the end portions and exerts an outside pressure on the membranes. The liquid in the membranes moves toward both ends of the housing and exerts an inside pressure overcoming the outside pressure of the potting material until the potting material solidifies.

11 Claims, 6 Drawing Figures

FIG_1 (PRIOR ART)
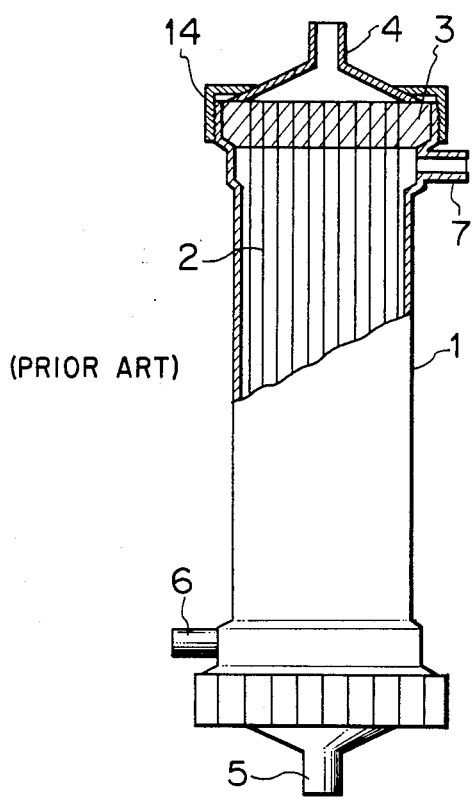
FIG_2(a) (PRIOR ART)
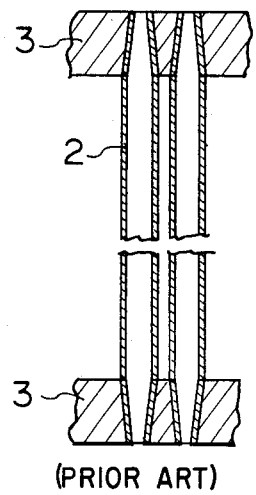
FIG_2(b) (PRIOR ART)
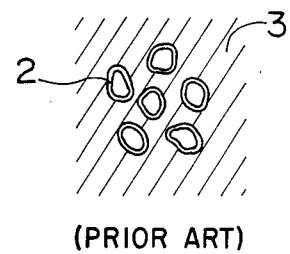
FIG_6(a)
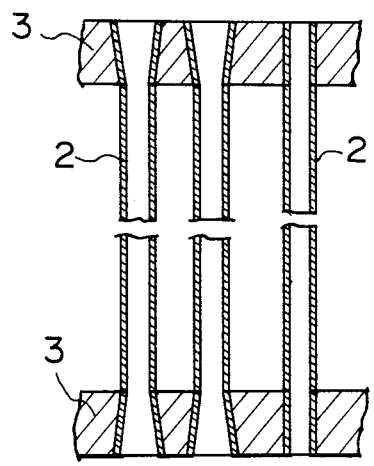
FIG_6(b)
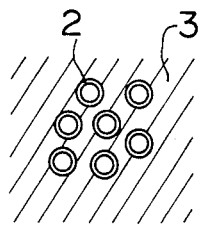

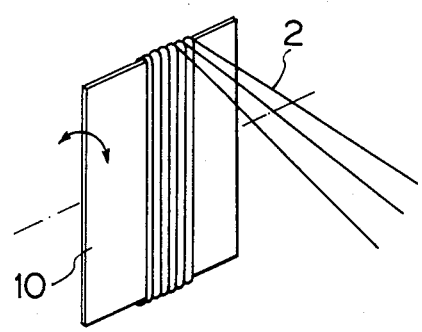
FIG_3
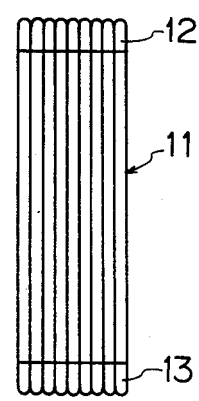
FIG_4
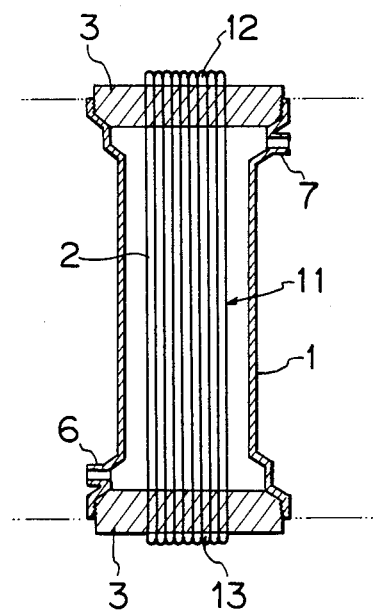
FIG_5

HOLLOW FIBER DEVICE FOR REMOVING WASTE MATERIAL IN THE BLOOD AND A PROCESS OF MANUFACTURE THEREOF

This is a continuation of application Ser. No. 520,002, filed Aug. 3, 1983, now abandoned.

BACKGROUND OF THE INVENTION

This invention relates to a device made of fibers hollow in the lengthwise direction, for removing waste or noxious material in the blood at high efficiency, and a process of manufacture thereof.

For patients with chronic renal failure, there have been used filter membranes, made of the hollow fibers, in hemo dialyzers; membranes or oxygen suppliers in artificial lungs for exchanging oxygen and carbonic acid gas have been also known.

The prior art, for example as shown in FIG. 1, shows a filter which has a housing 1 containing a plurality of the hollow fiber membranes. The housing has 2 fine holes in walls 3, in which both ends of each membrane are fixed with a potting material made of polyurethane, silicone resin or the like. A blood inlet 4 is provided at one side and a blood outlet 5 at the other side of the housing.

Hemo dialysis is carried out by penetrating the blood of the patient into the hollow fiber membranes 2 through the inlet 4, while the dialyzate is introduced into the housing 1 via an inlet 6, so that undesirable substances in the blood are moved via the membrane wall of the hollow fiber membrane 2 to the side of the dialyzate due to penetration pressure or negative pressure, and removed to the outside through an outlet 7.

The hollow fiber device for removing undesirable substances is in general made according to the following process.

The hollow fibers are stored on polygonal spools to which they are applied from bobbins, and the stored fibers are cut at proper length to make a plurality of bundles. The bundles of the hollow fibers are set in the housing 1, and applied onto their both end portions with a sealing agent, such as polyurethane, and effected with a centrifuge operation (primary centrifugation) so that the end portions are stopped. Subsequently, the potting material such as polyurethane or silicone resin is applied to both ends of the housing 1, and the bundles of fibers are again effected with a centrifuge operation (secondary centrifugation) so that the potting material forming walls 3 is solidified. Then the ends of the hollow fiber bundles are cut transversely according to a required length and made open for blood inlet 4 and outlet 5.

However, in view of the above process, since the fibers are hollow by themselves then when they are cut, the liquid contained therein runs out. Under this condition, if the secondary centrifugation were carried out, the hollow fiber would be made thinner at end portions as shown in FIG. 2 due to the pressure on the potting material of walls 3, accompanying the centrifugal force, or the opening would be deformed as shown in FIG. 2(b), so that it would be difficult for the blood to flow into the hollow fiber 2, and above all blood hemolysis or blood clot could be caused around openings of the hollow fibers, and bubble removal could not be smoothly performed at pliming. Further, since it is not easy for the blood to enter the hollow fiber, the dialytic effect is lowered in a unit dialytic area. Therefore, it is necessary to supply the hollow fibers for heightening the dialytic effect. However, if so, the inlet and outlet must be increased in cross sectional area, resulting in using more of potting agent or making the whole body of the housing heavy in weight. In addition, since the opening of the hollow fiber 2 is deformed in shape as mentioned, the potting material does not perfectly adhere to the outside of the end portions of the fiber so that fine gaps or slits are made and so delamination would easily happen to cause the blood clot or blood stay and lead to a blood leak.

In the prior art, as the membrane wall of the hollow fiber becomes thicker, the above mentioned defects would be remarkable, and prompt resolution has been demanded.

SUMMARY OF THE INVENTION

The present invention has been devised through many investigations in order to settle problems existing in conventional devices, and to provide a device made of hollow fibers for transferring undesirable substances in the blood and a process of manufacture thereof.

A 1st object of the invention is to make the shaped end portions of the hollow fiber membranes larger in cross section towards the ends of the fibers in order to effect a smooth movement of the liquid.

A 2nd object of the invention is to heighten the dialytic effect in the unit dialytic area by providing said smooth movement.

A 3rd object of the invention is to check the blood hemolysis or blood clot with respect to the hollow fiber membrane and provide a smooth return of the blood at completion of dialysis of the membrane, and to prevent the blood stay in the hollow fiber membrane or the openings thereof and to make the bubble removal easy at pliming.

A 4th object of the invention is to perfectly adhere the potting material to the outside of the opening at the end portions of the membrane by providing a real circle in the cross-section thereof.

The present invention will be discussed with reference to the attached drawings.

BRIEF DESCRIPTION OF THE DRAWINGS

FIG. 1 is a partial cross sectional view of a prior art hollow fiber device for transferring undesirable substances in the blood;

FIG. 2(a) is an enlarged side view showing the ends of a conventional hollow fiber membrane;

FIG. 2(b) is an enlarged plan view showing shapes at the openings of the fibers, also according to the prior art;

FIG. 3 is a perspective view showing the hollow fibers, stored on a spool;

FIG. 4 is a side view of bundles of the hollow fibers;

FIG. 5 is a cross sectional view of the fiber device for explaining a process according to the invention;

FIG. 6(a) is a sectional view showing the ends of an inventive hollow fiber membrane; and FIG. 6(b) is a top plan view showing shapes at the openings of the inventive fiber membrane.

DETAILED DESCRIPTION OF THE PREFERRED EMBODIMENTS

Actual embodiments of the invention will be explained with reference to an artificial kidney of the hollow fiber type. The hollow fiber membranes 2 are, as shown in FIG. 3, taken up from a plurality of bobbins to a spool of plate shape on which they are stored, and the fiber membranes 2 are drawn from the spool 10 and bundles 11 are made as shown in FIG. 4.

For the hollow fiber membranes 2 with respect to the blood dialysis, the membrane device or the artificial lungs, there are used cellulose substances such as cuprammonium rayon, viscose rayon or cellulose acetate, other synthetic polymer substances such as polyvinyl alcohol, ethylene vinyl alcohol, polypropylene or polymethyl methacrylate. The inner diameter of the fiber is about 200 to 300 $\mu$ and the membrane thickness is about 5 to 20 $\mu$.

The bundles 11 remain curved at both ends 12, 13 and the hollow fibers support the liquid therewithin. The bundles 11 are then applied with stoppers at both ends and are set in the housing 1. Subsequently, caps are provided to cover the both ends, and the potting material such as polyurethane or silicone resin is poured to the both ends via appropriate means (for example from the dialyzing ports 6 and 7), and centrifugal force is applied to the both ends. The centrifugal force is of 60 to 200 G, preferably 85 to 125 G, depending upon the thickness of the membrane and other conditions. The potting material is urged to the both ends of the housing 1 and closely penetrates between the fibers 2 and becomes solidified as time advances and forms walls 3 which stiffly hold the hollow fibers.

After solidification of the potting material, the housing 1 is taken out from the centrifuge and an end part of each wall 3 of potting material is cut transeversely with length as shown with a dashed line in FIG. 5, and bundles 11 are thereby made opened at both ends. Then the housing 1 is provided with the blood inlet 4 and outlet 5 by means of rings 14 as shown in FIG. 1.

As mentioned above, it is important that the hollow fibers are subjected to the centrifugation under condition of filling the liquid into the hollow fibers. For this aim, the both ends 12, 13 of the bundles 11 should be closed, and no limitation is made to means therefor. For example, the both ends may be tied or closed with the sealing agent. In the above embodiment, the both ends are closed, and depending upon condition one end may be closed. Further, FIG. 3 illustrates an example of the spool 10, and no limitation is made to the plated spool. The above mentioned embodiment has been explained with the example of the artificial kidney, and the device according to the invention may be employed in medical means such as an oxygen supplier, or other kinds using the hollow fibers such as industrial membrane devices.

If a liquid to be filled into the fibers 2 is used, which is in specific gravity larger than the wall 3 of the potting material, the ends will be shaped more effectively as later mentioned.

As having mentioned in accordance with the invention, the hollow fibers 2 are filled with the liquid and are housed within the housing under the condition that the ends of the fiber are closed, and the fibers are applied with the potting material to the end portions thereof. After having applied the potting material or while applying it, the centrifugal force is added, and therefore the filled liquid is urged toward the end portions of the fibers due to the centrifugal force, then the proper inner pressure is effected to the ends. This inner pressure is larger than the external pressure which is added by the potting material of wall 3 at the outer circumference of the end portions of the hollow fibers. The hollow fibers are made of elastic material such as cellulose, synthetic polymer substances or the like, and have the membrane thickness to the extent that the inner diameter is enlarged by pressure of the filled liquid effected due to the centrifugal force. Therefore, as shown at the left side in FIG. 6(a), the inner diameter of the hollow fiber increases in cross section, or is equal in cross-section along the length as shown at the right side in FIG. 6(a) because the outside and inside at the end portions of the fiber are equal in the pressure. The shapes of the ends in horizontal cross section are, as shown in FIG. 6(b), exactly circular due to balancing the inner and outer pressure of the end portions of the hollow fibers.

Therefore according to the invention, the movement of the liquid within the hollow fiber is made smoother in comparison with the prior art, and so the blood hemolysis or blood clot may be avoided and the blood is smoothly returned at completion of the dialysis in the membrane. The blood stay may be also prevented from the interior or opening of the hollow fiber, and bubble removal may be carried out easily at pliming. Since the blood is moved smoother within the hollow fiber, the dialytic effect is heightened in the unit dialytic area as compared to the conventional one which uses the hollow fibers of the same number. Therefore it is not necessary to enlarge the cross sectional areas of the inlet and outlet. In addition, the amount of potting material to be used may be reduced so that the whole body is made light in weight.

Since the opening at the end portion of the hollow fiber is exactly circular according to this invention, the potting material is perfectly adhered to the outer circumference of the fiber, thereby leakage of the blood is prevented. Further, according to the invention, the membrane of the hollow fiber may be reduced in thickness.

I claim:

1. A method of manufacturing a medical hollow fiber device for removing waste material in the blood, including a housing having two ends, a plurality of bundles of hollow fiber membranes having an interior, an exterior and open end portions, the bundles of membranes provided in the housing for moving the waste material in the blood from the interior of the membrane to the exterior thereof, and two opposing closures which receive the open end portions of the fiber membranes, the method comprising the steps of:

providing a housing;
coiling the hollow fiber membranes into loops;
providing bundles of looped hollow fiber membranes and placing them into the housing;
filling a liquid into the entire interior of the hollow fiber membranes;
closing both ends of the housing with caps;
supplying viscous potting material into the housing at the end portions of the hollow fiber membranes while keeping the end portions of the hollow fiber membranes unrestrained in a transverse direction by any additional member;
applying a centrifugal force to the housing whereby the potting material penetrates between the end portion and exerts an outside pressure on the membranes, and whereby the liquid in the membranes moves toward both ends of the housing and exerts an inside pressure acting against the outside pressure of the potting material until the potting material solidifies, so that the inside pressure in the end portions of the hollow fiber membranes overcomes the outside pressure of the potting material before its solidification because the ends of the hollow fiber membranes are unrestrained by any additional member, thereby providing a uniformly increasing circular cross-section in the end portions of the hollow fiber membranes to effect smooth fluid flow, the liquid also serving to keep potting material out of the end portions of the hollow fiber membranes;

cutting the opposing closures after the potting material has solidified to make said end portions open; and providing openings for the blood running at the ends of the housing.

2. The method as defined in claim 1; and further including the step of storing the hollow fiber membranes on a spool in bundles.

3. The method as defined in claim 1, wherein said membranes are made of cellulose.

4. The method as defined in claim 1, wherein said membranes are made of synthetic polymer.

5. The method as defined in claim 1, wherein said membranes have an inner diameter of 200 to 300 $\mu$ and a thickness of 5 to 20 $\mu$.

6. The method as defined in claim 1, wherein said closing step includes tying up of the ends of the bundles.

7. The method as defined in claim 1, wherein said closing step includes closing by a sealing agent the ends of the bundles.

8. The method as defined in claim 1, wherein said centrifugal force is of 60 to 200 G.

9. The method as defined in claim 1, wherein said liquid is of a specific gravity greater than that of the potting material.

10. The method as defined in claim 1, wherein said bundles providing step includes forming such bundles which are not limited radially outwardly, so that when the liquid fills the end portions of the membranes in the bundles and centrifugal force is applied the end portions of all membranes unobjectionally assume the circular cross section, since they are not radially outwardly limited.

11. A method of manufacturing a medical hollow fiber device for removing waste material in the blood, including a housing having two ends, a plurality of bundles of hollow fiber membranes having an interior, an exterior and open end portions, the bundles of membranes provided in the housing for moving the waste material in the blood from the interior of the membrane to the exterior thereof, and two opposing closures which receive the open end portions of the fiber membranes, the method comprising the steps of:

providing a housing;

coiling the hollow fiber membranes into loops;

providing bundles of looped hollow fiber membranes whose entire interior is filled with a liquid and placing them into the housing;

closing both ends of the housing with caps;

supplying viscous potting material into the housing at the end portions of the hollow fiber membranes while keeping the end portions of the hollow fiber membranes unrestrained in a transverse direction by any additional member;

applying a centrifugal force to the housing whereby the potting material penetrates between the end portions and exerts an outside pressure on the membranes, and whereby the liquid in the membranes moves toward both ends of the housing and exerts an inside pressure acting against the outside pressure of the potting material until the potting material solidifies, so that the inside pressure in the end portions of the hollow fiber membranes overcomes the outside pressure of the potting material before its solidification because the ends of the hollow fiber membranes are unrestrained by any additional member, thereby providing a uniformly increasing circular cross-section in the end portions of the hollow fiber membranes to effect smooth fluid flow, the liquid also serving to keep potting material out of the end portions of the hollow fiber membranes;

cutting the opposing closures after the potting material has solidified to make said end portions open; and providing openings for the blood running at the ends of the housing.

* * * * *